United States Patent
Chen

(10) Patent No.: US 10,686,970 B2
(45) Date of Patent: Jun. 16, 2020

(54) IP CAMERA HAVING COVER FOR BLOCKING ENTRANCE PATH TO MEMORY CARD RECEIVING SLOT

(71) Applicant: Sercomm Corporation, Taipei (TW)

(72) Inventor: Chia-An Chen, Taipei (TW)

(73) Assignee: SERCOMM CORPORATION, Taipei (TW)

( * ) Notice: Subject to any disclaimer, the term of this patent is extended or adjusted under 35 U.S.C. 154(b) by 0 days.

(21) Appl. No.: 15/951,444

(22) Filed: Apr. 12, 2018

(65) Prior Publication Data
US 2019/0058813 A1 Feb. 21, 2019

(30) Foreign Application Priority Data

Aug. 16, 2017 (CN) .................... 2017 2 1025602 U

(51) Int. Cl.
*H04N 5/225* (2006.01)
*G03B 17/56* (2006.01)
*G03B 17/02* (2006.01)

(52) U.S. Cl.
CPC ........... *H04N 5/2252* (2013.01); *G03B 17/02* (2013.01); *G03B 17/561* (2013.01); *H04N 5/2251* (2013.01)

(58) Field of Classification Search
CPC ........ G03B 17/02; G03B 19/04; G03B 17/56; G03B 17/04; G03B 15/03; G03B 17/561; H04N 5/2251; H04N 5/2252; H04N 5/2253; H04N 5/2254
USPC .......... 348/14.01–14.06, 143, 148, 373–376; 396/539–541; D16/200, 205, 208, 218, D16/219, 242
See application file for complete search history.

(56) References Cited

U.S. PATENT DOCUMENTS

| | | | |
|---|---|---|---|
| 3,415,600 A | 12/1968 | Yarbrough | |
| 4,633,644 A | 1/1987 | Haroutel et al. | |
| 4,694,334 A | 9/1987 | Bucher et al. | |
| 4,740,840 A | 4/1988 | Bucher et al. | |
| 5,581,299 A | 12/1996 | Raney | |

(Continued)

FOREIGN PATENT DOCUMENTS

| | | |
|---|---|---|
| CN | 2211614 Y | 11/1995 |
| CN | 2831186 Y | 10/2006 |

(Continued)

OTHER PUBLICATIONS

EPO Search Report dated Sep. 12, 2018 in EP application (No. 18170548.4-1208).

*Primary Examiner* — Yogesh K Aggarwal
(74) *Attorney, Agent, or Firm* — McClure, Qualey & Rodack, LLP

(57) ABSTRACT

An IP camera including a camera body and a cover is provided. The camera body includes an engaging face arranged on a side contoured surface surrounding the camera body and has a receiving slot being concave inwards the camera body from the engaging face for insertion of a memory card. The cover has an opening and an internal surface surrounding the opening. The internal surface of the cover is configured to surround and engage with the engaging face of the camera body. The cover is configured to block an entrance path to the receiving slot when the internal surface of the cover surrounds and engages with the engaging face of the camera body.

9 Claims, 5 Drawing Sheets

(56) References Cited

U.S. PATENT DOCUMENTS

| | | | |
|---|---|---|---|
| D618,269 S | 6/2010 | Williams et al. | |
| 7,762,505 B2 | 7/2010 | Muller | |
| D733,781 S * | 7/2015 | Chen | D16/202 |
| 9,377,157 B1 | 6/2016 | Kilgore et al. | |
| 9,519,986 B1 | 12/2016 | Kolliopoulos et al. | |
| 9,631,767 B2 | 4/2017 | Kilgore et al. | |
| 2002/0186317 A1* | 12/2002 | Kayanuma | H04N 1/00204 348/373 |
| 2009/0117946 A1* | 5/2009 | Tomasini | H04M 1/04 455/569.2 |
| 2009/0179990 A1 | 7/2009 | Zhang et al. | |
| 2010/0025587 A1 | 2/2010 | Benlloch Baviera et al. | |
| 2012/0314125 A1* | 12/2012 | Takahashi | H04N 5/232 348/373 |
| 2013/0222871 A1 | 8/2013 | Wardega | |
| 2015/0049202 A1* | 2/2015 | Okabe | G03B 17/02 348/207.1 |
| 2015/0326748 A1 | 11/2015 | Tisch et al. | |
| 2015/0362825 A1 | 12/2015 | Kim et al. | |
| 2016/0028927 A1* | 1/2016 | Kubotera | H04N 5/2252 348/374 |
| 2017/0045806 A1* | 2/2017 | Tsuge | G03B 17/02 |

FOREIGN PATENT DOCUMENTS

| | | |
|---|---|---|
| CN | 203705805 U | 7/2014 |
| CN | 203788370 U | 8/2014 |
| CN | 204143144 U | 2/2015 |
| CN | 204442579 U | 7/2015 |
| CN | 100361506 C | 12/2015 |
| CN | 100538500 C | 12/2015 |
| CN | 102891950 | 12/2015 |
| CN | 105704358 | 12/2015 |
| CN | 205458741 U | 8/2016 |
| CN | 205509545 U | 8/2016 |
| CN | 106192801 A | 12/2016 |
| CN | 205812179 U | 12/2016 |
| JP | 2004141014 | 12/2016 |

\* cited by examiner

IP CAMERA HAVING COVER FOR BLOCKING ENTRANCE PATH TO MEMORY CARD RECEIVING SLOT

This application claims the benefit of People's Republic of China Serial No. 201721025602.8, filed Aug. 16, 2017, the disclosure of which is incorporated by reference herein in its entirety.

TECHNICAL FIELD

The disclosure relates in general to an IP camera, and more particularly to an IP camera having a cover for blocking an entrance path to a memory card receiving slot.

BACKGROUND

In the daily lives, various Internet Protocol (IP) cameras have been common not only indoors but also outdoors. The IP camera can transmit images and/or sounds to a remote host via the Internet. In addition, some IP cameras can store these images and/or sounds in a memory card.

However, there is a risk that the memory card of the IP camera may be lost.

SUMMARY

The disclosure is directed to an IP camera. A particular shape of the cover may assure a blockage of the entrance path to the receiving slot to prevent the memory card from being lost.

According to one aspect, an IP camera is provided. The IP camera includes a camera body and a cover. The camera body includes an engaging face and has a receiving slot. The engaging face is arranged on a side contoured surface surrounding the camera body. The receiving slot is concave inwards the camera body from the engaging face for insertion of a memory card. The cover has an opening and an internal surface surrounding the opening. The internal surface of the cover is configured to surround and engage with the engaging face of the camera body. The cover is configured to block an entrance path to the receiving slot when the internal surface of the cover surrounds and engages with the engaging face of the camera body.

Figure 1A:
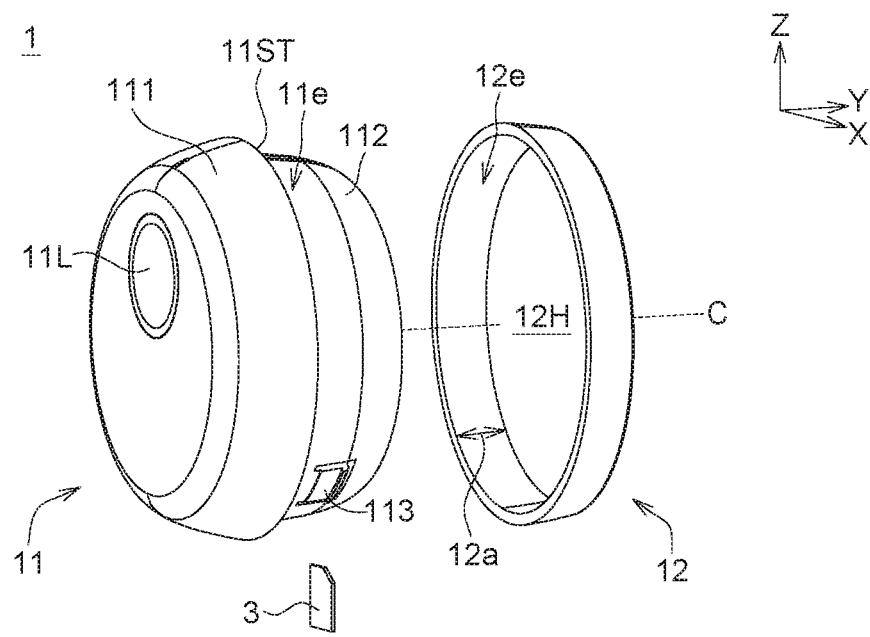
FIGS. 1A-1C illustrate exploded diagrams at different viewing angles of an IP camera according to one embodiment of the present disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

Figure 1B:
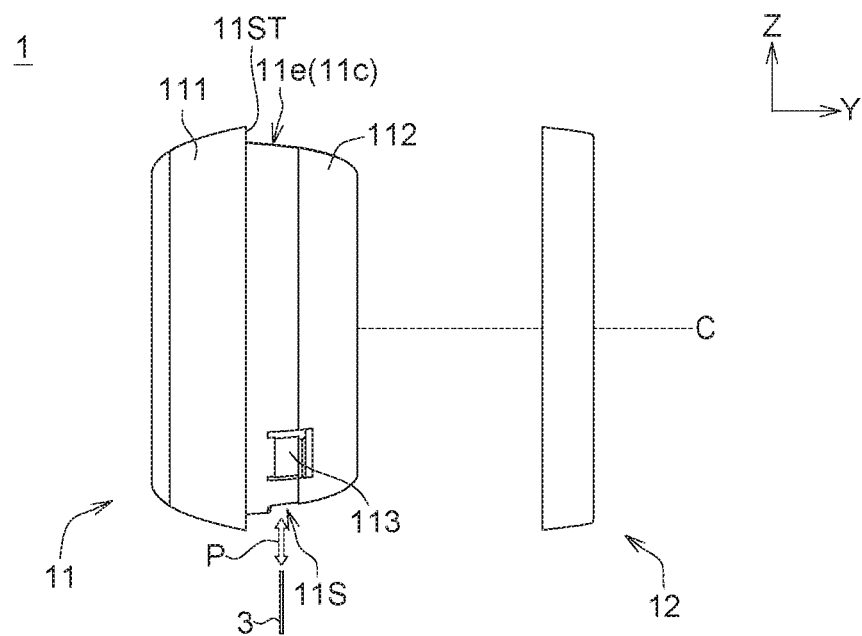
Figure 1C:
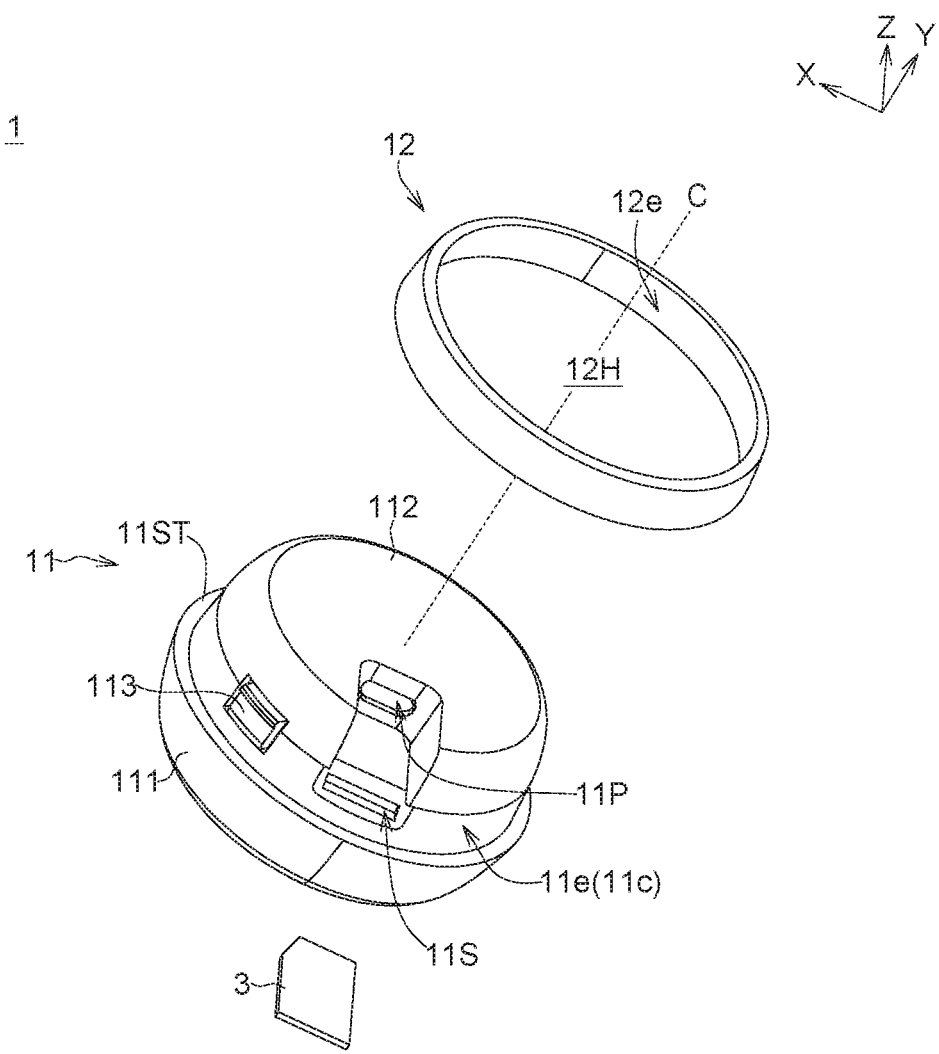

Referring to FIGS. 1A-1C, FIGS. 1A-1C illustrate exploded diagrams at different viewing angles of an IP camera 1 according to one embodiment of the present disclosure. The IP camera 1 includes a camera body 11 and a cover 12. As shown in FIG. 1B and FIG. 1C, the camera body 11 has a receiving slot 11S for insertion of a memory card 3. The memory card 3 may be, for example, a flash memory card or a subscriber identification module (SIM) card, but the present disclosure is not limited thereto. The cover 12 is detachably mounted on a side contoured surface 11c of the camera body 11. Specifically, as shown in FIG. 1A and FIG. 1C, the cover 12 has an opening 12H and an internal surface 12e surrounding the opening 12H. The internal surface 12e of the cover 12 is configured to surround and engage with an engaging face 11e of the camera body 11. When the internal surface 12e of the cover 12 surrounds and engages with an engaging face 11e of the camera body 11, an entrance path P to the receiving slot 11S is blocked by the cover 12 to prevent the memory card 3 in the receiving slot 11S from falling out or being withdrawn from the receiving slot 11S.

In detail, the engaging face 11e is arranged on the side contoured surface 11c surrounding the camera body 11. The receiving slot 11S is concave inwards the camera body 11 from the engaging face 11e, as shown in FIG. 1B and FIG. 1C. In one embodiment, the engaging face 11e may be one section of the side contoured surface 11c of the camera body 11. In other embodiments, the engaging face 11e may substantially be the same as the side contoured surface 11c of the camera body 11.

The opening 12H of the cover 12 may have a central axis C which is substantially parallel to the Y axis, as shown in FIGS. 1A-1C. In one embodiment, the depth of the internal surface 12e along the central axis C is substantially equal to the depth of the engaging face 11e along the Y axis. For example, the depth 12a (designated in FIG. 1A) of the internal surface 12e along the central axis C may be greater than 4 millimeters, so as to ensure the cover 12 can fully block the entrance path P. In another embodiment, the cover 12 may include an annular structure having an axial depth greater than 4 millimeters. Under a condition that the engaging face 11e is substantially correspond to the side contoured surface 11c of the camera body 11, the depth of the internal surface 12e is substantially equal to the depth of the side contoured surface 11c. Thus, a design about the particular shape and/or size of the cover 12 may assure blockage of the entrance path P to the receiving slot 11S.

In the present embodiment, the opening 12H of the cover 12 is circular in shape. Thus, when the internal surface 12e of the cover 12 surrounds and engages with the engaging face 11e of the camera body 11, the camera body 11 may rotate relative to the cover 12, wherein the rotation axis is substantially parallel to the Y axis depicted in the drawing to freely modify the shooting direction of the camera body 11. In other embodiments, the shape of the opening 12H of the cover 12 may not be limited to circle; instead, the opening 12H of the cover 12 may substantially be, for example, elliptical, triangular, square, other polygonal and so on.

In addition, the camera body 11 may further include one or more hook structure 113 which may be arranged on the engaging face 11e. In the present embodiment, the hook structure 113 is a resilient structure. In detail, the hook structure 113 is conductive to elastic deformation in a direction substantially perpendicular to the engaging face 11e. While the cover 12 moves towards the negative Y axis to engage with the camera body 11, the hook structure 13 is deformed inwards the camera body 11 by the press of the cover 12. When the internal surface 12e of the cover 12 surrounds and engages with the engaging face 11e of the camera body 11, the hook structure 113 returns back right through the stored elastic energy. Thus, the hook structure 113 may prevent the cover 12 from being loosened towards the positive Y axis. Furthermore, if the camera body 11 is going to be taken off towards the negative Y axis, it is required to press the hook structure 113 inwards the camera body 11 first. Then, the camera body 11 can be separated from the cover 12.

In other embodiments, the cover 12 may firmly fit on the engaging face 11e of the camera body 11 by the tolerance between the opening 12H of the cover 12 and the camera body 11. Thus, the one or more hook structure 113 may be omitted.

Referring to FIG. 1A and FIG. 1B, the camera body 11 may further include a front portion 111, a stop portion 11ST and a rear portion 112. The front portion 111 and the rear portion 112 may respectively be the front and rear of the camera body 11. The front portion 111 and the rear portion 112 are separated from each other by the stop portion 11ST. Here, a lens 11L of the camera body 11 is disposed on the front portion 111. The stop portion 11ST is disposed on a part of the front portion 111 which the engaging face 11e is adjacent to, and the engaging face 11e may be located on the rear portion 112. Specifically, there may be a level difference between the front portion 111 and the engaging face 11e. In other words, there may be a level difference between the front portion 111 and the rear portion 112, and the level difference is right where the stop portion 11ST is disposed. That is, a cross-sectional area of the camera body 11 which the stop portion 11ST is located on is larger than a cross-sectional area of the camera body 11 which the engaging face 11e is located on. Therefore, the cover 12 may fit to the camera body 11 only from the rear portion 112 towards the negative Y axis. When the internal surface 12e of the cover 12 surrounds and engages with the engaging face 11e of the camera body 11, the cover 12 may abut against the stop portion 11ST instead of keeping on moving towards the negative Y axis. At this time, the cover 12 remains on the engaging face 11e.

On the other hand, in one embodiment, the cross-sectional area of the rear portion 112 may be varied gradually along the Y axis. As shown in FIG. 1B, the cross-sectional area of the rear portion 112 gradually decreases towards the positive Y axis. In other words, the cross-sectional area of the camera body 11 which the engaging face 11e is located on gradually decreases in a direction from the front portion 111 to the rear portion 112 (i.e., the positive Y axis). Likewise, the size of the opening 12H of the cover 12 also gradually decreases in the same direction. Therefore, the cover 12 can smoothly fit to the camera body 11 from the rear portion 112 towards the negative Y axis.

Referring to FIG. 1C, the camera body 11 may further include a connection port 11P. The connection port 11P may be, for example, a connection port for a power supply line or a network line to be plugged into. The connection port 11P is disposed on the rear portion 112 and concaves inwards the camera body 11 from the side contoured surface 11c, wherein the direction which the connection port 11P is concave towards is perpendicular to the Y axis. Moreover, the connection port 11P is disposed farther away from the front portion 111 of the camera body 11 than the engaging face 11e and the receiving slot 11S. Under such a design, in a condition that a wire is inserted into the connection port 11P when the cover 12 engages with the camera body 11, the wire may prevent the cover 12 from moving towards the positive Y axis. In this case, it is required to remove the wire from the connection port 11P first, and only then can the cover 12 be separated from the camera body 11. After that, the memory card 3 received in the receiving slot 11S can be taken out. However, once the wire is removed from the connection port 11P under a normal operating state, the IP camera 1 may send an alert notification, such as sound, blink, or wireless message, to notify user that the wire has been removed. Therefore, it may further prevent the memory card 3 from being stolen by others.

In a condition of engaging with the camera body 11, the cover 12 may block the entrance path P to the receiving slot 11S. In another embodiment, the cover 12 may further serve as a holder to support the weight of the camera body 11.

Figure 2:
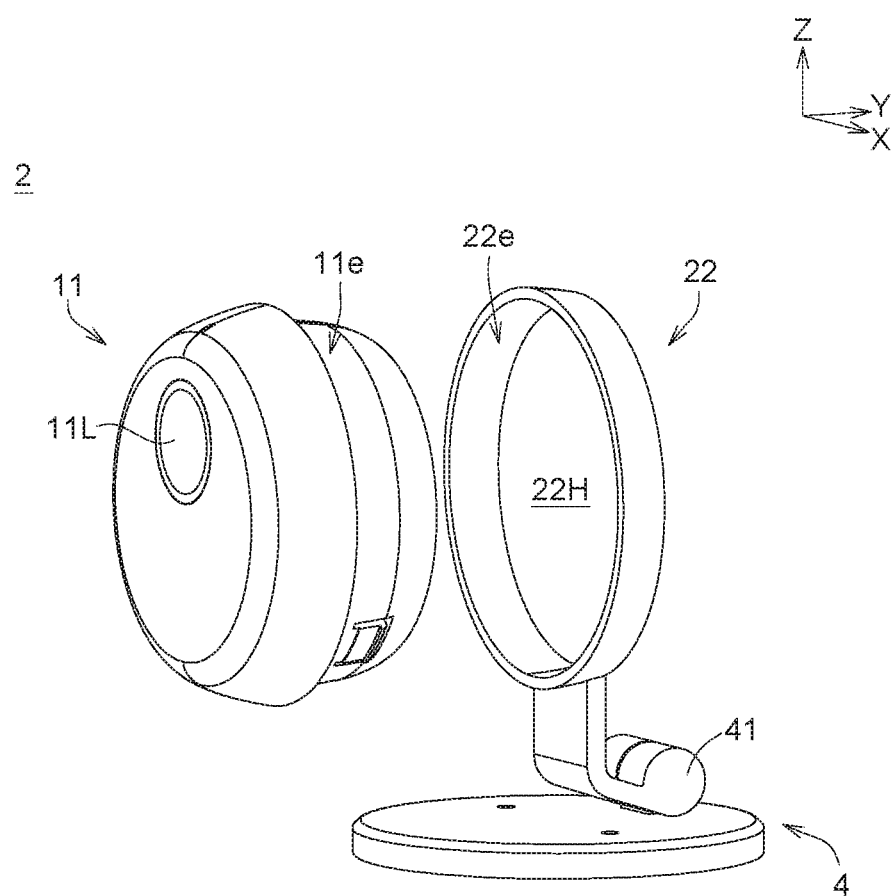
FIG. 2, FIG. 3A, FIG. 3B, FIG. 4 and FIG. 5 illustrate schematic drawings showing how to assemble an IP camera according to another embodiment of the present disclosure.

Referring to FIG. 2, FIG. 2 illustrates an exploded diagram of an IP camera 2 according to another embodiment of the present disclosure. The difference between the embodiment of FIGS. 1A-1C and the embodiment of FIG. 2 is that the cover 22 in the embodiment of FIG. 2 serves as a holder, and the internal surface 22e of the cover 22 additionally serves as a supporting surface to support the weight of the camera body 11. When the internal surface 22e of the cover 22 surrounds and engages with the engaging face 11e of the camera body 11, the camera body 11 occupies the opening 22H of the cover 22 and is supported by the internal surface 22e.

As shown in FIG. 2, the IP camera 2 may further include a foot 4. The foot 4 may be disposed on or fastened on any plane, such as the table, the wall and the ceiling, to support the weight of the IP camera 2 on the plane. The foot 4 includes a jointing element 41 connected to the cover 22. The jointing element 41 may be, for example, a universal joint.

The following content describes steps for assembling the IP camera 2 with reference to FIGS. 2-5. It is understood that these steps may be applied to the embodiment of FIGS. 1A-1C as well. As shown in FIG. 2, in the first step, the camera body 11 and the cover 22 are separated from each other.

Figure 3A:
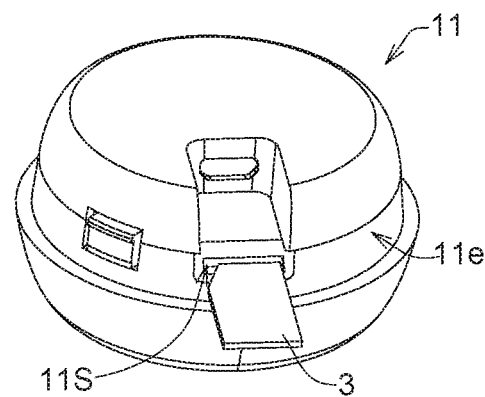
Figure 3B:
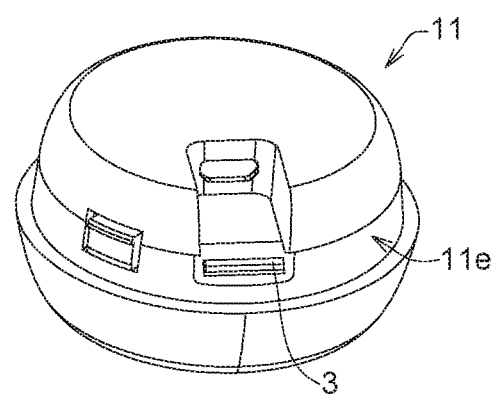

Sequentially, as shown in FIG. 3A, the memory card 3 is inserted into the receiving slot 11S. As shown in FIG. 3B, when the memory card 3 is received in the receiving slot 11S, the memory card 3 does not protrude out from the engaging face 11e.

Figure 4:
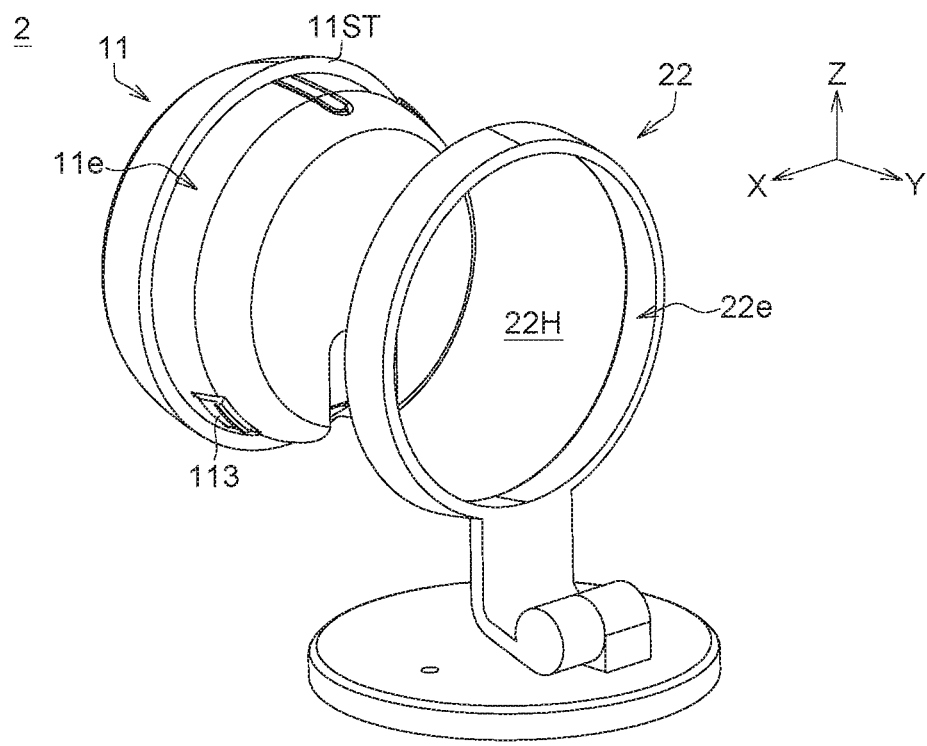

Afterwards, as shown in FIG. 4, the camera body 11 is inserted into the opening 22H of the cover 22 so that the internal surface 22e of the cover 22 surrounds and engages with the engaging face 11e of the camera body 11. At the same time, the cover 22 may abut against the stop portion 11ST instead of keeping on moving towards the negative Y axis relative to the camera body 11. On the other hand, the hook structure 113 may prevent the camera body 11 from being detached from the cover 22 towards the negative Y axis. Meanwhile, the entrance path P to the receiving slot 11S is blocked by the cover 22, so that the memory card 3 cannot leave the receiving slot 11S.

Figure 5:
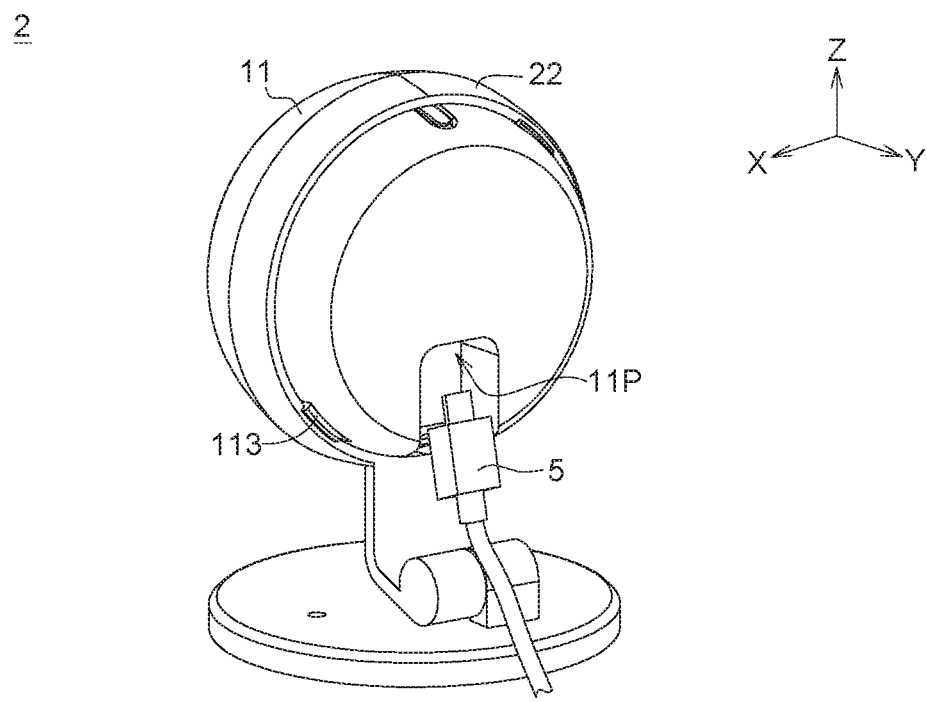

Lastly, as shown in FIG. 5, a wire 5 is inserted into the connection port 11P. The wire 5 prevents the camera body 11 from moving towards the negative Y axis relative to the cover 22. Even if not restricted by the hook structure 113, the camera body 11 still cannot be detached from the cover 22. That is, if it is desired to separate the camera body 11 from the cover 22, or further take the memory card 3 out of the receiving slot 11S, it is required to remove the wire 5 first. Then, the camera body 11 can be separated from the cover 22 so that the entrance path P to the receiving slot 11S is no longer blocked by the cover 22, and the memory card 3 is allowed to enter or be taken out of the receiving slot 11S. Through these structures, it may further protect the user's privacy.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. An IP camera comprising:
  a camera body comprising a lens and an engaging face and having a receiving slot, the lens having an optical axis, the engaging face arranged on a side contoured surface surrounding the camera body, the receiving slot being concave inwards the camera body from the engaging face for insertion of a memory card; and
  a cover having an opening and an internal surface surrounding the opening, the opening being open at front and back of the cover, and a length of the cover along the optical axis being less than a length of the camera body;
  wherein the internal surface of the cover is configured to surround and engage with the engaging face of the camera body, and the cover is configured to block an entrance path to the receiving slot when the internal surface of the cover surrounds and engages with the engaging face of the camera body.

2. The IP camera according to claim 1, wherein when the memory card is inserted into the receiving slot, the memory card does not protrude out from the engaging face.

3. The IP camera according to claim 1, wherein when the internal surface of the cover surrounds and engages with the engaging face of the camera body, the camera body occupies the opening of the cover and a weight of the camera body is supported by the cover through the internal surface.

4. The IP camera according to claim 1, wherein the opening of the cover has a central axis, and a depth of the internal surface along the central axis is greater than 4 millimeters.

5. The IP camera according to claim 1, wherein the cover comprises an annular structure having an axial depth greater than 4 millimeters.

6. The IP camera according to claim 1, wherein the camera body further comprises a front portion, a stop portion and a rear portion, a lens of the camera body is disposed on the front portion, the stop portion is disposed on a part of the front portion which the engaging face is adjacent to, and a cross-sectional area of the camera body which the stop portion is located on is larger than a cross-sectional area of the camera body which the engaging face is located on.

7. The IP camera according to claim 6, wherein the engaging face is located on the rear portion, and the cross-sectional area of the camera body which the engaging face is located on gradually decreases in a direction from the front portion to the rear portion.

8. The IP camera according to claim 6, wherein the camera body further comprises a connection port disposed on the rear portion and being concave inwards the camera body from the side contoured surface, and the connection port and the front portion are separated by the engaging face.

9. The IP camera according to claim 6, wherein the camera body further comprises a connection port disposed on the rear portion, and when the internal surface of the cover surrounds and engages with the engaging face of the camera body and a wire is inserted into the connection port, the wire prevents the camera body from being detached from the cover.

* * * * *